No. 807,032. PATENTED DEC. 12, 1905.
G. W. KELLOGG.
COUPLING FOR TIRE CHARGING VALVES.
APPLICATION FILED FEB. 1, 1905.
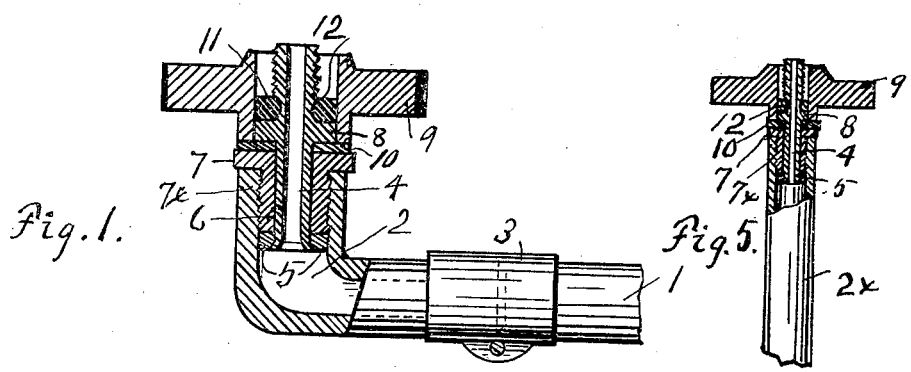
Fig. 1. Fig. 5.
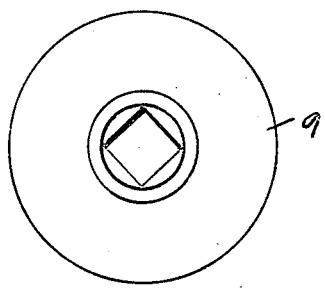 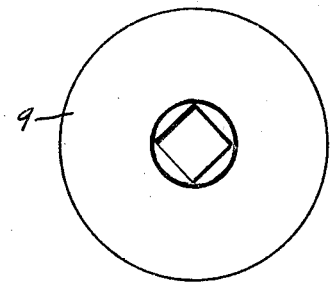
Fig. 2. Fig. 3.
Fig. 4.
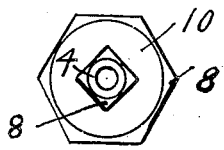
Witnesses
C. M. Catlin
Paul Main
Inventor
Geo. W. Kellogg,
By Benj. R. Catlin
Attorney

UNITED STATES PATENT OFFICE.

GEORGE W. KELLOGG, OF ROCHESTER, NEW YORK.

COUPLING FOR TIRE-CHARGING VALVES.

No. 807,032.  Specification of Letters Patent.  Patented Dec. 12, 1905.

Application filed February 1, 1905. Serial No. 243,699.

*To all whom it may concern:*

Be it known that I, GEORGE W. KELLOGG, a resident of Rochester, in the county of Monroe and State of New York, have invented certain new and useful Improvements in Couplings for Tire-Charging Valves; and I do hereby declare the following to be a full, clear, and exact description of the invention, such as will enable others skilled in the art to which it pertains to make and use the same.

This invention relates to couplings and to such as are adapted to connect with a pneumatic-tire-charging valve; and its object is to provide a simple, cheaply-constructed, and easily-assembled coupling.

The invention consists in the construction hereinafter described and pointed out.

In the accompanying drawings, forming part of this specification, Figure 1 is a central longitudinal section of the improved coupling. Fig. 2 is a plan of a milled screw-actuating nut. Fig. 3 is a bottom view of the same. Fig. 4 is an end view of the inner tube. Fig. 5 is a section of the device on a smaller scale and showing a straight coupling-tube instead of an elbow.

Numeral 1 denotes a hose or pipe, 2 a hollow communicating elbow or equivalent, and 3 a coupling.

$2^{\times}$, Fig. 5, indicates a straight tube substituted for the elbow 2 of Fig. 1.

4 indicates a tube provided at its interior end with a stop for a sleeve, said stop being in the instance illustrated a ring 5, which is conveniently fixed thereto by upsetting its end, as indicated. 6 is a screw-threaded sleeve or thimble bearing against said ring and provided with an angular head or flange 7, whereby it is adapted to be screwed into the suitably-threaded elbow or similar hose-fixture $7^{\times}$. This thimble is placed on tube 4 before ring 5 is fixed thereon.

8 is an angular flange on the tube to operatively engage a similarly-formed seat in the hollow milled thumb-piece 9, whereby the rotation of said piece rotates the tube.

10 denotes a packing of leather or the like contiguous the sleeve 6, and 11 is a packing of similar material between the tube and milled thumb-piece to effectually prevent the escape of air. The packing 11 has an annular seat 12 in the tube 4, substantially as indicated.

The parts are assembled by first putting the packing 10 on the tube and then the sleeve 6, whereupon the ring is secured to the tube and the milled thumb-piece placed thereon and secured by forcing the flexible compressible elastic washer or packing 11 down between the tube and thumb-piece and into its seat in the tube, where it does the double duty of preventing loss of compressed air and holding the milled thumb-piece on the tube.

The coupling is secured to the elbow 2 or to a straight tube $2^{\times}$ by screwing the sleeve therein, and the tube is connected to or disconnected from the inlet-nipple of a tire by suitably turning the thumb-piece. It is evident that the sleeve when screwed sufficiently into the elbow compresses both packings and forces packing 11 against both the tube and thumb-piece, thereby effectually sealing the device and holding in place the milled thumb-piece. To remove the latter, it would be necessary to cut and pull or push out this washer.

Having thus described my invention, what I claim is—

1. In a coupling, the combination of the hose-fixture a coupling to connect said fixture with a hose, the rotatable tube 12 having one end screw-threaded and having at its other end a stop 5, the externally-threaded sleeve situated between the tube and fixture to connect the same, and means for rotating the tube to screw it into a corresponding tube or nipple.

2. In a coupling, the combination of the hose-fixture, the screw-threaded tube having at its inner end a stop, the sleeve to connect the tube and hose-fixture, means for rotating the tube for screwing it into a corresponding tube or nipple said means consisting of a thumb-piece, and packing between the thumb-piece and tube.

3. In a coupling, the combination of the hose-fixture, the screw-threaded tube having at its inner end a stop, the sleeve to connect the tube and hose-fixture, means for rotating the tube to screw it into a corresponding tube or nipple, and packing between the thumb-piece and tube, said tube having a seat for the packing.

4. In a coupling, the combination of a hose-fixture, a tube rotatively connected thereto, means to rotate the tube to connect it to a nipple, and a packing holding the thumb-piece on the tube.

5. In combination the tube 7 having the flange and screw-threaded at one end to fit a nipple or the like, the thumb-piece, the packing between the tube and thumb-piece, and means for connecting the tube to a hose-fixture, said packing being compressed between the thumb-piece and tube and the latter provided with a seat for the packing.

6. In combination the tube 7 having the flange screw-threaded at one end to fit a nipple or the like, the thumb-piece, the packing between the tube and thumb-piece, means for connecting the tube to a hose-fixture, said packing being compressed between the thumb-piece and tube and the latter provided with a seat for the packing, and a packing between the tube-flange and said connecting means substantially as set forth, whereby both packings may be compressed by rotating the thumb-piece.

In testimony whereof I have signed this specification in the presence of two subscribing witnesses.

GEORGE W. KELLOGG.

Witnesses:
 FRED. MUTSCHLER,
 F. M. SIMPSON.